(12) United States Patent
Linford et al.

(10) Patent No.: US 9,568,391 B2
(45) Date of Patent: Feb. 14, 2017

(54) PIPELINE MONITORING UNIT AND METHOD

(71) Applicant: Syrinix Ltd., Hethel, Norwich (GB)

(72) Inventors: Paul Linford, Norfolk (GB); Ben Smither, Norfolk (GB)

(73) Assignee: Syrinix Ltd., Hethel (GB)

( * ) Notice: Subject to any disclaimer, the term of this patent is extended or adjusted under 35 U.S.C. 154(b) by 168 days.

(21) Appl. No.: 14/179,680

(22) Filed: Feb. 13, 2014

(65) Prior Publication Data
US 2014/0224026 A1 Aug. 14, 2014

(30) Foreign Application Priority Data

Feb. 14, 2013 (GB) .................................. 1302596.0

(51) Int. Cl.
*G01M 3/28* (2006.01)
*G01L 9/00* (2006.01)

(52) U.S. Cl.
CPC .............. G01M 3/28 (2013.01); *G01L 9/0041* (2013.01)

(58) Field of Classification Search
CPC .................................................. G01M 3/2815
See application file for complete search history.

(56) References Cited

U.S. PATENT DOCUMENTS

| 4,356,444 A * | 10/1982 | Saenz, Jr. ............... G01R 27/20 324/425 |
| 4,516,206 A * | 5/1985 | McEvilly ............... G01V 1/288 367/40 |
| 4,609,994 A | 9/1986 | Bassim et al. |
| 4,977,529 A * | 12/1990 | Gregg ....................... G09B 9/00 376/245 |
| 5,333,501 A | 8/1994 | Okada et al. |
| 5,987,990 A | 11/1999 | Worthington et al. |
| 6,082,193 A | 7/2000 | Paulson |
| 6,212,133 B1 * | 4/2001 | McCoy ................... G01S 19/34 342/357.43 |
| 6,253,624 B1 | 7/2001 | Broden et al. |
| 7,470,060 B1 | 12/2008 | Hoben et al. |

(Continued)

FOREIGN PATENT DOCUMENTS

| EP | 2006654 | 12/2008 |
| EP | 2314997 | 4/2011 |

(Continued)

*Primary Examiner* — Laura Martin
*Assistant Examiner* — Alex Devito
(74) *Attorney, Agent, or Firm* — Leason Ellis LLP

(57) ABSTRACT

A pipeline monitoring unit and method are disclosed. The unit includes a pressure monitoring unit couplable to a pipeline and arranged to monitor fluid pressure in the pipeline over time when coupled to the pipeline and generate data on the fluid pressure at a first sampling rate. A processing unit is arranged to process the data from the pressure monitoring unit to downsample at least a portion of the data from the pressure monitoring unit to a second sampling rate, the second sampling rate being less than the first sampling rate, to generate working data and monitor the samples in the working data for samples having predetermined characteristics to identify a transient event. Upon identifying a transient event, data including at least a portion of the data from the pressure monitoring unit having the first sampling rate is communicated to a remote system for analysis.

18 Claims, 5 Drawing Sheets

(56) References Cited

U.S. PATENT DOCUMENTS

| | | |
|---|---|---|
| 2006/0005635 A1 | 1/2006 | Breen et al. |
| 2008/0047329 A1* | 2/2008 | Breed .............. G01N 35/00871 |
| | | 73/61.41 |
| 2008/0143344 A1 | 6/2008 | Focia et al. |
| 2008/0314122 A1 | 12/2008 | Hunaidi et al. |
| 2009/0000381 A1 | 1/2009 | Allison et al. |
| 2010/0011869 A1* | 1/2010 | Klosinski .................. G01F 1/42 |
| | | 73/700 |
| 2011/0156957 A1* | 6/2011 | Waite .................... G01S 5/0221 |
| | | 342/450 |

FOREIGN PATENT DOCUMENTS

| | | |
|---|---|---|
| JP | 11064151 | 3/1999 |
| JP | 2004117174 | 4/2004 |
| RU | 2190152 | 12/2000 |
| WO | WO2009129959 | 10/2009 |
| WO | WO2010007637 | 9/2010 |
| WO | WO 2012153147 | 11/2012 |

* cited by examiner

PIPELINE MONITORING UNIT AND METHOD

FIELD OF THE INVENTION

The present invention relates to a pipeline monitoring unit and method that is particularly applicable to monitoring for transient events in pipelines such as water supply pipelines.

BACKGROUND TO THE INVENTION

Operational distribution pipes contain a fluid (water, for example) whose pressure is constantly fluctuating. Some fluctuations are high in magnitude and occur over hours or days and others are lower in magnitude but happen at a much higher frequency (in the order of 1 Hz). In comparison, a transient event is a rapid, unusual, short duration deviation from normal operation (typically a few seconds) which is large in magnitude.

In water supply networks, pipe pressure must be carefully controlled in order to maintain a consistent supply to the customer, protect the network infrastructure and adhere to regulatory guidelines and laws. Unfortunately the control systems currently in place do not always maintain a constant pressure. Indeed, given the nature of the network, it is practically impossible to do so, and aspects of the control system's operation often give rise to pressure transient events.

There are many causes of pressure transient events on water pipes. For some of these events, the cause can be easily identified but for other events the cause is not clear. A non-exhaustive list of events which cause a pressure transient would include:
  Fast opening/closing of a valve on a long supply line resulting in a water hammer effect.
  Equipment failure (pump, PRV (pressure regulating valve)).
  Water main burst.
  Diurnal usage pattern.
  Configuration changes (opening/closing of boundary valves).
  Pumping events (filling water towers etc.).
  Un-moderated industrial and commercial customers.

Pressure transients can stir up the sediment in the pipe, causing water discolouration and brown water events. These events are monitored by the regulator in the United Kingdom and will result in low performance scores for the operating company and possible fines. Pipelines which have corroded, have failing joints or have been otherwise damaged can be caused to fail by a pressure transient. A low pressure transient (below the surrounding pressure) can cause water to be drawn into the main, via a leak for example, bringing with it potentially harmful unclean and uncontrolled water.

Trying to discriminate real transients from the background noise using rate detection and thresholding is prone to: error, missing key events, and producing false positives. Such an approach has been adopted in the past with varying degrees of success. The pressure data for such an analysis is commonly acquired by a logging device attached to the pipeline that stores all measured pressure values for a duration of, typically, several weeks. The logger is then retrieved, the data down-loaded into a computer and then analysed. The fundamental disadvantage with this approach is that the operator of the pipeline does not receive any information about a transient event until some considerable time after it has happened. The information is then so out of date that its value has diminished considerably.

STATEMENT OF INVENTION

According to an aspect of the present invention, there is provided a pipeline monitoring unit comprising:
  a pressure monitoring unit couplable to a pipeline and arranged to monitor fluid pressure in the pipeline over time when coupled to the pipeline and generate data on the fluid pressure at a first sampling rate;
  a processing unit arranged to process the data from the pressure monitoring unit to:
    downsample at least a portion of the data from the pressure monitoring unit to a second sampling rate, the second sampling rate being less than the first sampling rate, to generate working data;
    monitor the samples in the working data to for samples having predetermined characteristics to identify a transient event; and,
    upon identifying a transient event, communicating data including at least a portion of the data from the pressure monitoring unit having the first sampling rate to a remote system for analysis.

The monitoring of the samples in the working data may include determining a static pressure value for the pipeline and filtering data from the working data corresponding to the static pressure value.

The monitoring of the samples in the working data may include dividing the data stream into analysis windows of X samples and for each window in turn:
Remove the static pressure value by subtracting the mean of samples within the window from each sample;
Calculate the RMS power of the window;
Compare the RMS power to a predetermined threshold; and,
if the threshold is exceeded, deeming that a transient is present at that point in time.

BRIEF DESCRIPTION OF THE DRAWINGS

Embodiments of the present invention will now be described with reference to the accompanying drawings, by way of example only, in which.

DETAILED DESCRIPTION

Figure 1:
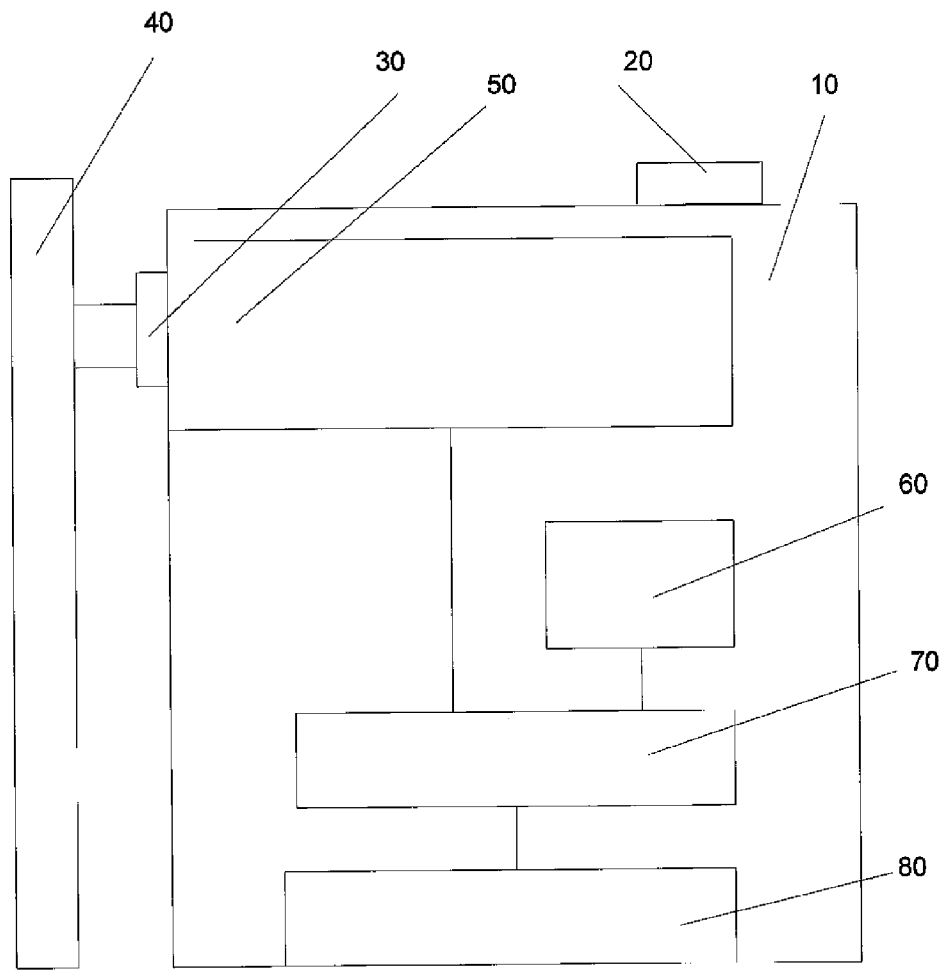
FIG. 1 is a schematic diagram of a pipeline monitoring unit 10 according to an embodiment of the present invention.
Figure 2:
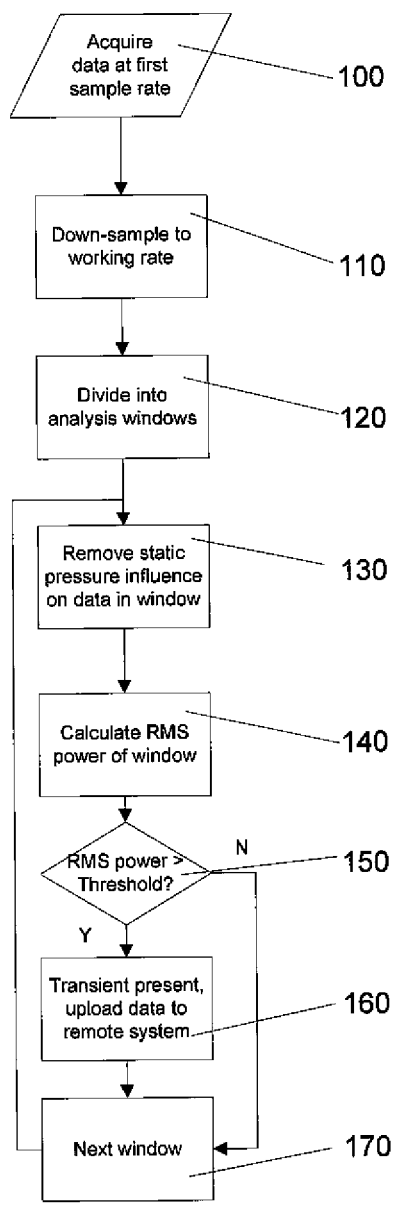
FIG. 2 is a flow diagram of a method according to an embodiment of the present invention.

FIG. 1 is a schematic diagram of a pipeline monitoring unit 10 according to an embodiment of the present invention. The monitoring unit 10 includes a power source connector 20, a port 30 couplable to a pipeline 40, a pressure sensor 50 coupled to the port 30, a memory 60, a processing unit 70 and a communication unit 80. A power source such as a battery may be situated externally of a body of the monitoring unit 10 and connected by a cable or the like to the power source connector to power the monitoring unit 10. Alternative power sources such as solar power or a power source internal to the monitoring unit 10 could equally be used.

The pressure sensor 50 is arranged to monitor fluid pressure in the pipeline over time when the port 30 is coupled to the pipeline (for example by a hose connected to a fluid path passing through the pipeline) and generate data on the fluid pressure at a first sampling rate. In one example, the first sampling rate is 100 samples per second. The data sampled at the first sampling rate is stored in the memory 60.

The processing unit 70 is arranged to process the data from the pressure monitoring unit to:
- downsample at least a portion of the data from the pressure monitoring unit to a second sampling rate, the second sampling rate being less than the first sampling rate (in one example the second sampling rate is 1 sample per second), to generate working data;
- monitor the samples in the working data to for samples having predetermined characteristics to identify a transient event; and,
- upon identifying a transient event, causing data, including at least a portion of the data from the memory 60, to be transmitted to a remote system for analysis.

In one embodiment, the pressure sensor may be a transducer such as a diaphragm which is measured for pressure changes (for example by a resistive, capacitive, optical or other sensing element measuring displacement or deformation of the diaphragm). Downsampling may include converting the output from the transducer in an analogue to digital converter (ADC) and approximating samples from the output of the ADC.

The predetermined characteristic may, for example, be the root mean square (RMS) power of samples over a predetermined period exceeding a predetermined threshold.

Preferably, the memory 60 has a limited capacity and is operated as a queue, circular buffer or the like, retaining only a predetermined window (preferably a number of windows) of "raw" non-down-sampled data. If a transient event is not detected in the down-sampled data, the data in the memory will be overwritten or otherwise pass out of the memory and more recent samples will take its place. Should a transient event be detected, at least a proportion of the data in the memory is communicated to a remote system such by upload to a server for analysis. The data is still overwritten by more recent samples as before. Optionally, a longer term memory may be provided in which the non-down-sampled data recorded around the time of the detected transient is written. In such an arrangement, the longer term memory can act as a buffer should the network connection to the remote system be slow or prone to dropping, for example.

The memory 60 and/or the longer term memory may be, for example, flash memory.

The pipeline monitoring unit 10 may include a display or other user notification mechanisms such as lights to guide the operator when installing the device.

FRAM (ferroelectric RAM) memory may be used to temporarily store the data before it is written to the flash storage and/or sent via GPRS or discarded. In one example, the FRAM memory may be provisioned to accommodate 250,000 samples, while the SD memory may accommodate 1,000,000,000 samples.

In preferred embodiments, long term data over time is collected by the (or each) pipeline monitoring unit 10 such that transient events can be reliably tracked through a pipeline network using a swarm of monitoring units spread across the network. Such tracking should generally allow the likely cause of the transient to be identified and procedures modified to prevent a reoccurrence, something not currently possible and a problem in water network management, for example.

Embodiments of the present invention enable sensitive detection of transient events whilst ignoring the background noise of the pipeline's normal operation. False positives are very much more unlikely with this method and it has the added benefit of being computationally light enough to run on a low power processor.

In preferred embodiments, the method is applied to pressure readings in real-time directly at the pressure measurement point by a small computational device.

As will be appreciated, the pipeline operator can be notified substantially immediately when and where a transient event occurs in the network. A chunk (for example, one or more packets) of data encapsulating the raw data recorded around the time of the event is uploaded to a remote system such as a server for evidence purposes, reporting activities and additional analysis if required on detection of a transient event.

In routine operation, almost all of the pressure readings acquired by the unit are similar to each other and are of very little value to the pipeline operator. There is no benefit, therefore, in storing or transmitting these values; the information of value is restricted to the period of time around the transient event.

An alternative to downsampling is to have two (or more) pressure sensors coupled to the pipeline and sampling at different sample rates, one for use in local substantially real time analysis for detecting transient events at a relatively low resolution and another for capturing higher resolution samples that can be communicated to a remote system for detailed analysis when a transient event is detected.

In one embodiment of the present invention, a method of monitoring for transients comprises:
- Acquiring in step 100 the pressure measurements on fluid in a pipeline at a high enough rate for remote (for example server-side) processing to be able to accurately determine transient shapes and time of onset. Typically this rate is 100 samples per second.
- Down-sampling the data in step 110 to a working rate; typically this is one sample per second;
- Dividing the data stream into analysis windows typically of X samples in step 120. Analysis windows may have a Y % overlap during processing.
- For each window in turn:
  - Removing in step 130 the static pressure value by subtracting the mean of samples within the window from each sample (de-meaning the window);
  - Calculating the RMS power of the window in step 140;
  - Comparing in step 150 the RMS power to a threshold;
  - If the threshold is exceeded, determining at step 150 that a transient is present at that point in time; and,
  - When a transient event is detected, a block of raw pressure data, of approximately ten minutes duration, is up-loaded in step 160 to a central server with data identifying the transient event.

In one embodiment, the window may define the block of raw pressure data that is uploaded.

Figure 3:
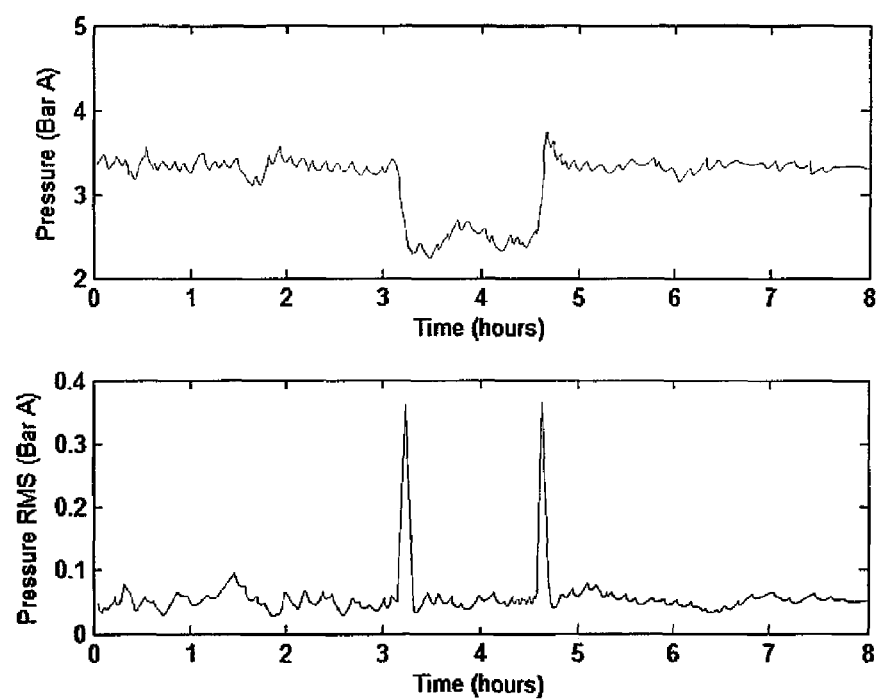
FIG. 3 shows graphs illustrating processing of a transient event.
Figure 4:
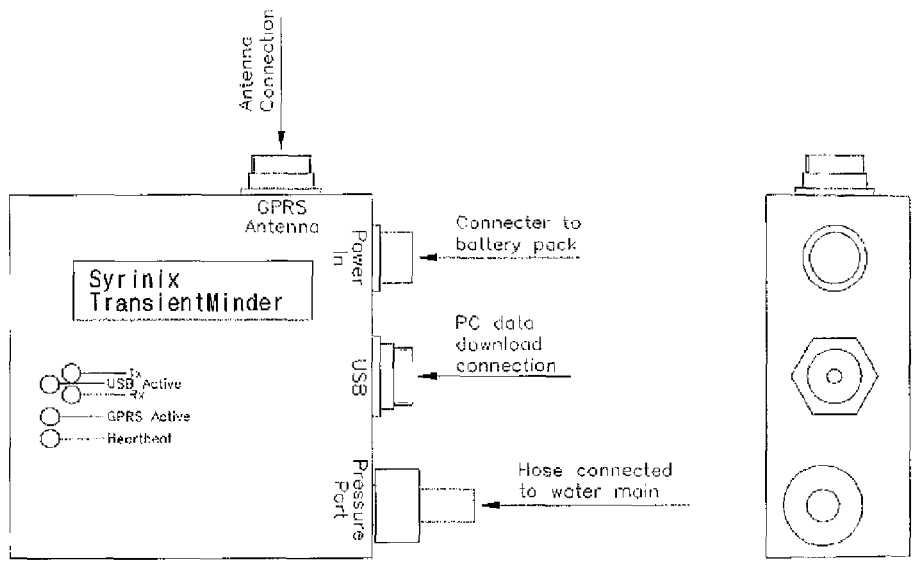
FIG. 4 is a front and side view of a pipeline monitoring unit according to an embodiment of the present invention.
Figure 5:
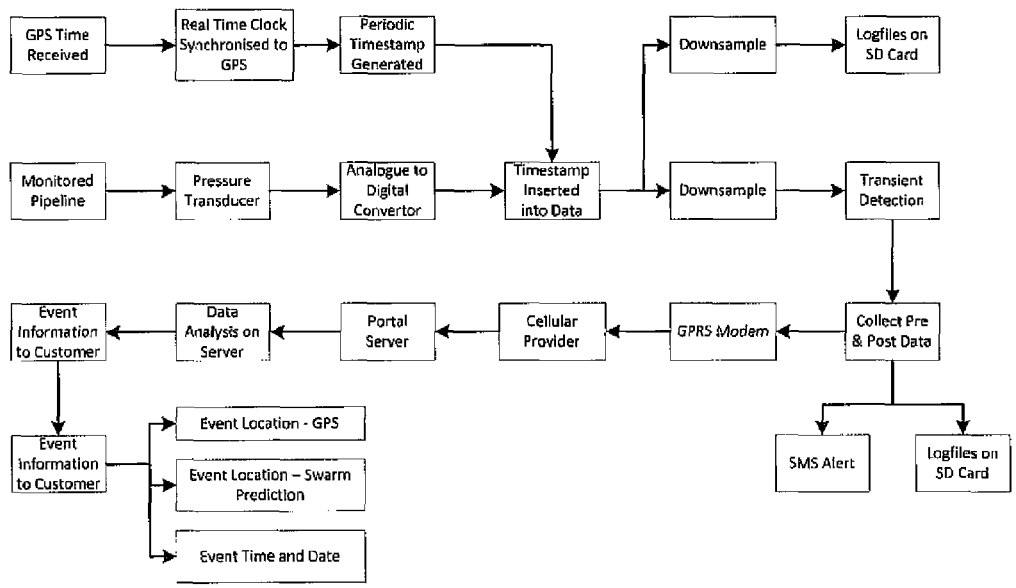
FIG. 5 is a schematic diagram including aspects of a system according to an embodiment of the present invention; and, FIG. 6 is a schematic diagram of aspects of a pipeline monitoring unit according to an embodiment of the present invention.
Figure 6:
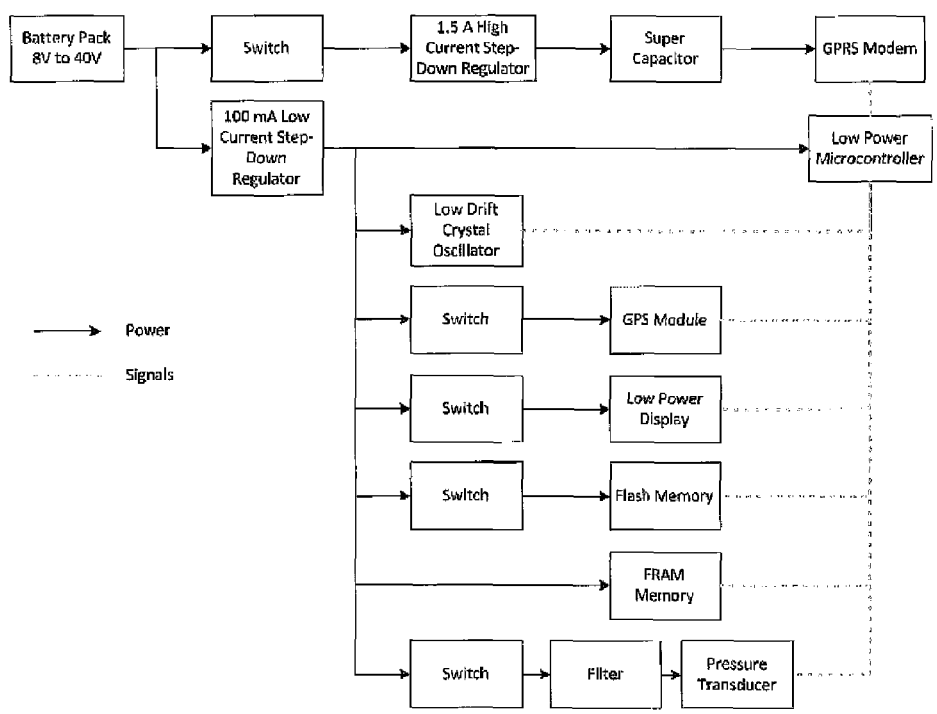

FIG. 3 shows the application of this method. The corresponding output from the analysis method is plotted in blue (bottom plot) below the raw pressure data which is shown in red (top plot). This plot shows one large event which, it could be argued, is actually 2 transient events consisting of a pressure drop at 3.25 hours followed by a recovery at 4.6 hours.

For this particular analysis, the pressure data is first down-sampled to 1 sample per second, split into windows of 128 samples with a 50% overlap, de-meaned, processed using the RMS calculation and plotted. These values are typical for this method but a range of values are used.

The RMS Power threshold adjusts the sensitivity of the unit to transient events. There are several ways in which this threshold can be determined:

By empirical experiments; a threshold of 0.2 to 0.3 (when the pressure is represented in Bar, as it is here) gives good results and identifies the transient events in the data stream.

By analysing historical RMS power data held within the unit, and determining characteristic range and mean values of which the threshold is a function. Continual adaption to changing pipe characteristics is possible in this mode.

By a one-time characterisation of the pipe to which the unit is attached.

All of these methods are incorporated into the unit and can be selected by adjusting the operational parameters (held in the instrument's setup file).

The above schema can easily be carried out on a workstation computer. A beneficial characteristic of this method is that the same calculations can be done with the same effectiveness using integer arithmetic which considerably reduces the computational load on the processor 70 in the pipeline monitoring unit 10 and enables the computations to be done locally by a low powered processor. Even with the low power electronic components available in 2013 it is still a substantial challenge to implement the schema described on a stand-alone self-contained unit which is battery powered and that can be deployed for many months without battery changes. The pipeline monitoring unit 10 described above represents a practical solution achievable with current technology. Preferably, the unit 10 carries out all the pressure reading acquisition and analysis in substantially real-time on a small embedded microprocessor. In one embodiment, the unit includes a cellular radio network transceiver for communication with the remote system (or other systems or control nodes).

Along with the reduced sample rate data the unit keeps a small buffer of data at the higher sample rate used to digitise the pressure sensor signal. When a transient event is detected, the high sample rate data surrounding the event is sent back to a server using the radio link.

Preferably, units are installed underground in fire hydrant chambers and connected to the pipeline network via the hydrant using standard hydrant adaptors. However, it will be appreciated that any valve or tapping can be utilised that gives access to the water inside the pipeline.

Time Keeping

It is important that the data at the first sampling rate be time stamped so that post-detection processing can correlate observed transients with other information about the water main, including data collected from other units in the pipeline. In one embodiment, the one-pulse-per-second time reference available from a GPS receivers when available is used to accurately time stamp the data. In practice, however, the GPS signal is generally not available in the underground chambers where this equipment needs to be deployed so an alternative time reference is required.

In one embodiment, a hybrid approach is applied which combines the high accuracy of the GPS time synchronisation available immediately before deployment with a temperature compensated crystal oscillator to provide pulses at a stable frequency to the processor which operates a real time clock (although it will be appreciated that the real time clock may be a separate component to the processor). At power on, whilst the unit is above ground, a GPS lock is obtained and the real-time clock is set. Once underground, the GPS receiver turns itself off (or it may be done by the installer or by the processing unit, or upon losing GPS lock for a predetermined time) and the real time clock is then used to timestamp the data. In one embodiment, a calibration option allows the drift associated with the crystal oscillator (which is approximately 30 seconds per year) to be reduced such that the time-stamp accuracy is sufficient to allow successful transient tracking. Various calibration options are possible. For example:

The crystal oscillator may be tested before deployment to measure or estimate a drift which is then used in operation to correct the clock either periodically or for each time stamp;

The GPS receiver may be re-activated (either periodically or during servicing or removal of the monitoring unit, for example) and the GPS time compared to the real time clock in order to re-synchronise the clock (and optionally to estimate a drift and correct saved samples for the drift).

Remote System

A remote system such as a server is used in one embodiment to aggregate and analyse the data from one or more units on the pipeline. The server-side system may send alerts from single transient and multiple transient detections. The alarm method may include one or more communications mechanisms that may be singularly triggered (or a multiple of different alert mechanisms may be triggered) including SMS text alerts, email, direct SCADA messaging etc.

It will be appreciated that when operating multiple units on a pipeline and reporting to a common remote system, units should correctly identifying themselves and their location.

Each unit has a unique identification number which is reported with the data. This number is not assigned to the unit but is read from the processor manufacturer's wafer and position number—it is thus hardwired into the processor and cannot be changed, nor can there be a duplicate.

The unit's position is determined using the GPS receiver when the clock is synchronised during deployment. The pipeline operator will undoubtedly make a record of the position and pipeline the unit is deployed on but the unit also records its position and reports this alongside any detected transient events reducing the confusion that arises when operators miss-record deployment details.

If multiple units are installed on one water main then a transient propagating along the main will give rise to multiple detections from each in sequence. There may be other detections due to reflections from closed valves and pipeline ends. This cascade of events, combined with network topology, is then used in a more advanced analysis which seeks to identify the source of the transient.

Power Management

Each unit is preferably a battery powered device operating in a confined physical space. Battery volume and hence energy availability are therefore limited making it important to ensure that the power consumption of the unit is minimised. The largest power consuming part of the unit is the radio link. However, local identification of transient events and transmission of only the pertinent data serves a dual purpose in maximising the value of the data transmitted and extending battery life by communicating only the information of highest value.

A low power processor (microcontroller) with a current draw of less than 0.3 mA may be selected. This processor manages the power consumption of other devices in the unit via a series of switches. Preferably, devices are only turned on when their function is required.

The supply current requirements of the cellular modem (such as GPRS) are significantly greater than those of the other components in the unit, requiring a high current regulator. Such a regulator is inefficient when only supplying small currents (when the modem is off) so preferably a second regulator is used which offers higher efficiency at lower currents for the remainder of the components.

The regulators chosen are preferably both switching regulators which offer tolerance of a wide range of input voltages without compromising efficiency.

It will be appreciated that the monitoring unit and method disclosed herein lends itself to distributed analysis techniques. For example, monitoring may be performed at a number of sites in a network. As a transient propagates through a pipeline it will create a transient event at a number of the sites. By correlating time stamps and magnitude of pressure that causes the transient event, a source of the transient can be triangulated or estimated.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. A pipeline monitoring unit comprising:
a pressure monitoring unit couplable to a pipeline and arranged to monitor fluid pressure in the pipeline over time when coupled to the pipeline and generate data on the fluid pressure at a first sampling rate;
a processing unit arranged to process the data from the pressure monitoring unit to:
(a) downsample at least a portion of the data from the pressure monitoring unit to a second sampling rate, the second sampling rate being less than the first sampling rate, to generate working data;
(b) monitor the samples in the working data for samples having predetermined characteristics to identify a transient event; and,
upon identifying a transient event, communicating data including at least a portion of the data from the pressure monitoring unit having the first sampling rate to a remote system for analysis.

2. A pipeline monitoring unit as claimed in claim 1, wherein the processing unit is arranged to determine a static pressure value for the pipeline and filter data from the working data corresponding to the static pressure value.

3. A pipeline monitoring unit as claimed in claim 1, wherein the processing unit is arranged to (b) monitor the samples in the working data by performing operations including:
(b1) dividing the data from the pressure monitoring unit into analysis windows of X samples and for each window in turn:
(b2) remove the static pressure value by subtracting the mean of samples within the window from each sample;
(b3) calculate the RMS power of the window;
(b4) compare the RMS power to a predetermined threshold; and,
(b5) if the threshold is exceeded, identifying that a transient is present at that point in time.

4. A pipeline monitoring unit as claimed in claim 1, wherein the unit is battery powered.

5. A pipeline monitoring unit as claimed in claim 1, further comprising a transceiver for wireless communication of the data including at least a portion of the data from the pressure monitoring unit having the first sampling rate to the remote system.

6. A pipeline monitoring unit as claimed in claim 1, wherein the processing unit is arranged to process the data from the pressure monitoring unit in (a) and (b) using integer arithmetic.

7. A pipeline monitoring unit as claimed in claim 1, further comprising a memory, wherein the pipeline monitoring unit is arranged to store data on the fluid pressure at the first sampling rate in the memory, the memory having a fixed capacity and being operated as a circular buffer.

8. A pipeline monitoring unit as claimed in claim 1, further comprising a global positioning system (GPS) receiver, the pipeline monitoring unit being arranged to time-stamp the data generated at the first sampling rate using a time reference obtained from the GPS receiver.

9. A pipeline monitoring unit as claimed in claim 8, further comprising a local time source, the pipeline monitoring unit being arranged to synchronize the local time source to the time reference and is arranged to time-stamp the data generated at the first sampling rate using the local time source.

10. A pipeline monitoring unit as claimed in claim 9, wherein the pipeline monitoring unit is arranged to apply a drift correction factor to the time stamp in dependence on time since the local time source was synchronized.

11. A pipeline monitoring unit as claimed in claim 9, wherein the pipeline monitoring unit is arranged to subsequently compare the local time source to a time reference obtained from the GPS receiver and retrospectively correct the time stamps in dependence on a difference between the local time source and the time reference.

12. A pipeline monitoring unit as claimed in claim 9, wherein the local time source comprises a temperature compensated crystal oscillator arranged to provide pulses at a substantially stable frequency.

13. A pipeline monitoring unit as claimed in claim 9, wherein the pipeline monitoring unit is arranged to synchronize the local time source to the GPS receiver time upon establishing a GPS lock.

14. A pipeline monitoring unit as claimed in claim 13, wherein the pipeline monitoring unit is arranged to synchronise the local time source after power-up upon the GPS receiver establishing a GPS lock.

15. A pipeline monitoring unit as claimed in claim 13, wherein the pipeline monitoring unit is arranged to disable the GPS receiver after synchronization of the local time source.

16. A pipeline monitoring method comprising:
acquiring pressure measurements on fluid in a pipeline at a first sample rate;
down-sampling the measurements acquired to a working rate having a sample rate less than the first sample rate;
monitoring the samples at the working rate for samples having predetermined characteristics to identify a transient event; and,
upon identifying a transient event, communicating data including at least a portion of the samples having the first sample rate to a remote system for analysis.

17. A method as claimed in claim 16, further comprising:
dividing the measurements at the working rate into analysis windows of a predetermined number of time-ordered samples;
removing static pressure effects on the measurements by subtracting the mean of samples within the window from each sample;
calculating the RMS power of the window;
comparing the RMS power to a predetermined threshold; and,
if the threshold is exceeded, identifying that a transient is present for that window.

18. A method of analyzing transient data comprising:
receiving data identifying a transient event from each of a plurality of sites on a pipeline operating the method of claim 16; and,
estimating an origin of the transient event in the pipeline in dependence on location of the sites, pressure measurements in the data and time stamps associated with each pressure measurement.

* * * * *